United States Patent
Peng et al.

(10) Patent No.: US 11,036,357 B2
(45) Date of Patent: Jun. 15, 2021

(54) GENERATING OR UPDATING CROSS-COMMUNITY STREAMS

(71) Applicant: salesforce.com, inc., San Francisco, CA (US)

(72) Inventors: Weiping Peng, San Jose, CA (US); HuaSheng Su, Fremont, CA (US); Jennifer Yang, Kirkland, WA (US); Paul Gene Byrne, Seattle, WA (US); Rasmus Mencke, San Francisco, CA (US); David Gary Mendelson, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 155 days.

(21) Appl. No.: 15/717,749

(22) Filed: Sep. 27, 2017

(65) Prior Publication Data
US 2019/0095054 A1    Mar. 28, 2019

(51) Int. Cl.
| | |
|---|---|
| *G06F 3/0482* | (2013.01) |
| *G06F 3/0485* | (2013.01) |
| *G06Q 30/00* | (2012.01) |
| *G06Q 50/00* | (2012.01) |
| *G06F 16/9535* | (2019.01) |

(52) U.S. Cl.
CPC .......... *G06F 3/0482* (2013.01); *G06F 3/0485* (2013.01); *G06F 16/9535* (2019.01); *G06Q 30/01* (2013.01); *G06Q 50/01* (2013.01)

(58) Field of Classification Search
CPC ............. G06F 17/30867; G06F 3/0482; G06F 3/0485; G06Q 30/01; G06Q 50/01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

FOREIGN PATENT DOCUMENTS

| | | |
|---|---|---|
| EP | 2972981 | 1/2016 |
| JP | 2016-517596 | 6/2016 |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Stephen S Hong
*Assistant Examiner* — Nicholas Hasty
(74) *Attorney, Agent, or Firm* — Weaver Austin Villeneuve & Sampson LLP

(57) ABSTRACT

Disclosed are examples of systems, apparatus, methods and computer program products for generating or updating cross-community streams. A plurality of communities can be maintained on behalf of a plurality of member organizations. Members of each community can have access to a corresponding set of records. One or more selections operable to assign one or more records to one or more cross-community streams can be displayed in a user interface on a display of a device of a first user. A first request from the first user to assign a first set of one or more records to a first cross-community stream can be processed. The first cross-community stream can be generated or updated.

20 Claims, 8 Drawing Sheets

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,832,003 B2 * | 11/2010 | Kelly ............... G06F 21/6245 380/250 |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,560,554 B2 | 10/2013 | Gradin et al. |
| 8,560,575 B2 | 10/2013 | Gradin et al. |
| 8,566,301 B2 | 10/2013 | Rueben et al. |
| 8,646,103 B2 | 2/2014 | Jakobson et al. |
| 8,700,714 B1 * | 4/2014 | Pan ............... H04N 21/2668 709/206 |
| 8,892,573 B2 | 11/2014 | Gradin et al. |
| 9,064,287 B2 | 6/2015 | Mencke |
| 9,300,620 B2 * | 3/2016 | Bradley ............... H04L 12/185 |
| 9,529,488 B2 | 12/2016 | Beechuk et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0150603 A1* | 6/2007 | Crull .............. G06Q 30/02 709/227 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0173461 A1* | 6/2014 | Shahade .............. H04L 65/403 715/753 |
| 2014/0144796 A1 | 9/2014 | Beechuk et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0120588 A1 | 4/2015 | Mencke |
| 2015/0142596 A1 | 5/2015 | Jakobson et al. |
| 2015/0172563 A1 | 6/2015 | Jakobson et al. |
| 2015/0180980 A1* | 6/2015 | Welinder .............. H04L 67/06 715/758 |
| 2015/0249717 A1 | 9/2015 | Mencke |
| 2016/0104067 A1* | 4/2016 | Xu .................. H04L 67/306 706/46 |
| 2017/0068646 A1 | 3/2017 | Beechuk et al. |
| 2018/0260579 A1 | 9/2018 | Bose et al. |
| 2018/0285933 A1* | 10/2018 | Lee-Chan .......... G06Q 30/0269 |

OTHER PUBLICATIONS

U.S. Appl. No. 15/453,723, filed Mar. 8, 2017, Bose et al.

* cited by examiner

GENERATING OR UPDATING CROSS-COMMUNITY STREAMS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to generating or updating cross-community streams. More specifically, this patent document discloses techniques for generating or updating cross-community streams in a social networking system.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks including tasks relating to social networking systems.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 4B shows an example of a cross-community stream as displayed on a computing device, in accordance with some implementations.

DETAILED DESCRIPTION

Figure 1:
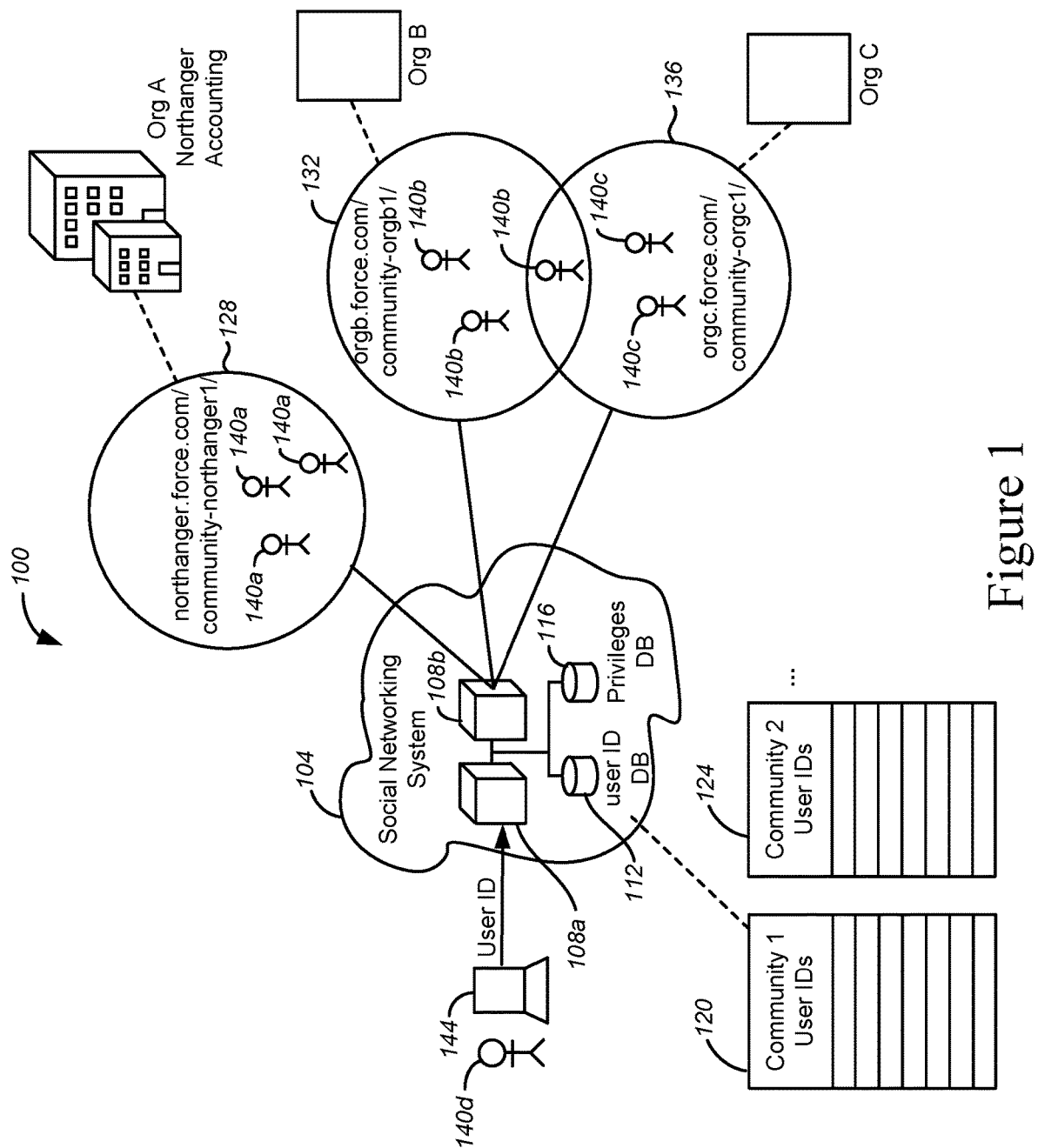
FIG. 1 shows a system diagram of an example of a social networking environment 100 with communities, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for generating or updating cross-community streams. A "stream" generally refers to a social networking feed containing curated feed content. Such streams may include content related to various records, which generally refer to any of a wide range of entities that are capable having a social networking feed, e.g., a user, a group, a database record, etc. In some implementations, such records may include customer relationship management (CRM) records, e.g., an account, a task, a lead, a contact, a contract, an opportunity etc. As used herein, the term "community" generally refers to a secure space for different stake-holders of an organization, such as employees, customers and partners of the organization, to collaborate with one another. Such communities are to be differentiated from "groups" of users in in a social networking system such as Chatter®, described in greater detail below. That is, a community of users may exist as an entity apart from and in addition to any group or groups of such users in the social network, although some of the rights and restrictions provided to a community member may be the same or similar as those provided to a member of a group.

Conventional social networking systems do not generally provide a robust framework for such communities much less allow users to easily consume feed content from multiple communities in the same context. By contrast, the disclosed techniques may be implemented to allow users to create and view a "cross-community stream," which is a stream that may be viewed from the context of multiple communities and may include feed content related to several communities. By way of example, Northanger Accounting is an accounting firm that implements Chatter®. Northanger Accounting has over 100 communities. In the absence of the disclosed techniques, each of these communities would be a separate destination to consume information. On the other hand, in some implementations of the disclosed techniques, any cross-community stream which is created in one community may be accessed in the context of other communities. By way of illustration, the Help Community is a customer community where Northanger Accounting customers may ask questions about services and products such as the new cloud-based Northanger tax preparation application. James is a support representative who answers questions in the Help Community. He can quickly answer questions in cross-community streams for the Help Community while working in the Salesforce.com® platform without having to navigate away from his current working environment. In another example, Catherine is working on completing over a dozen different deals each one associated with a different Chatter® community. Using the disclosed techniques, Catherine can quickly and easily consume information related to each community without changing her context.

Similarly, in some implementations, a cross-community stream can contain content related to a variety of sources. By way of example, Henry, an administrator at Northanger Accounting, creates an appeals cross-community stream that includes feed content relating to California tax appeals (a record that is associated with the California State Tax Community) as well as feed content published by Catherine (a Northanger Accounting employee who is in charge of the Federal Tax Appeals Community). Using the disclosed techniques, Isabella, head of appeals at Northanger Accounting, can then view the appeals cross-community stream to consume a variety of feed content, which is highly relevant to her work, in a single convenient place. Furthermore, she can easily navigate to the appeals cross-community stream from the context of any of the many Northanger Accounting communities.

The techniques disclosed herein may be applied in the context of a wide variety of streams. For instance, as discussed above, a stream generally refers to a social networking feed containing curated feed content. On the other hand, a cross-community stream is a type of stream that is viewable in the context of multiple communities. A person of skill in the art can appreciate that any concepts discussed herein in the context of examples of cross-community streams are also intended to be applicable to any kind of stream.

As discussed above, in some implementations, a community can be defined as a secure space for different stakeholders of an organization, such as employees, customers and partners of the organization, to collaborate with one another by accessing shared data, interacting with community-centric tasks and business processes, and using conversational services such as chat sessions, feed-based communication, and private messaging. The community can be structured and maintained as a public or private space for users having different relationships with the organization, so the users can converse and collaborate in an effective manner. The users can be of different types, such as internal or external, and/or the users can have different roles, such as employee, customer or partner, with such types and roles defining a user's relationship with the organization. For example, a partner can be an entity external to an organization that sells services and/or provides support on behalf of an employee, who is an internal user of the organization.

Multiple communities can be implemented, some affiliated with different organizations, and a user can navigate across the communities in a seamless fashion from the user's perspective.

In some instances, the community can provide various collaboration tools in a branded environment, for example, with community-specific web pages providing names, trademarks, themes, colors and other indicia of products, services, and/or an organization offering the product or service. Thus, a community can be a space with a branded look-and-feel for people to collaborate on data pertaining to the community and often pertaining to an organization with which the community is affiliated.

Each community can be structured so a community leader, system administrator or other user having appropriate security clearance can define rules governing community membership and privileges governing: i) access and use of various community data, ii) the ability to take action and cause events to occur in relation to the community, and iii) the visibility of users to each other. These various privileges can be defined and customized at a granular level, for instance, with different access rights and restrictions configured on a per-user or per-type of user basis, on a per-data item or per-type of data basis, and/or on a per-action or per-type of action basis.

In some instances, a user can have different user profiles for different communities. In other instances, a user can have a primary user profile and can select which fields of the profile are to be exposed to each community of which the user is a member. In some implementations, a user's community profile has a child-parent relationship with the primary profile and is tailored to inherit data from selected fields of the primary profile.

In some instances, a community can be open, as is often the case with public communities, in that there are no or minimal restrictions on users to access data, initiate actions, and view other community members' profiles, regardless of user type or role with respect to an organization. Thus, in a public community, employees, customers and partners of an organization affiliated with the community can freely view community data and each other's profiles, follow the same objects, and converse using the same feeds, by virtue of being members of the same community.

In some implementations of the disclosed communities, the same user identity (ID), such as a login name or email address assigned to a given user, can be used by a user to directly log in and thus gain access to a community, that is, without requiring the user to separately log in to the social networking system hosting the community, as well as allow the user navigate across multiple communities during a web browsing session. Thus, for example, a user is not required to supply login credentials each time the user clicks through a web page of a first community to a page of a second community. A single user ID can be used to navigate across various communities, some of which can belong to different organizations.

In some implementations, full collaboration in a community is possible regardless of user type or role. Internal and external users can be provided with full access or the same level of restricted access to the same feeds available through the community, and such users can view each other's walls and follow each other. The various types and/or roles of users can have the same rights to access and edit CRM records such as opportunities, leads, contacts, accounts, cases, etc. and collaborate with each other regarding such data using feeds. CRM data and files can traverse community boundaries, that is, such that members of different communities may have privileges to access and interact with the same CRM records.

The branding of a community can include custom network addresses such as uniform resource locators (URLs) with brand names included in a string of characters defining the URL. Thus, each community provided in an online social network can have a unique and branded URL customized to refer to a product, service, and/or organization by brand name. The branding of a community can also or alternatively include themes and color options presented as parts of one or more community pages to provide a look-and-feel identifying a brand of an organization. The navigation options for community pages can also be customized to include specific tabs and other components presented in a graphical user interface (GUI) that identify a brand or aspects of a brand associated with an organization.

Branding data in a community can be different from and can exclude any brands of the social networking system hosting the community. For instance, a community maintained in Chatter® can have pages with logos, themes and color schemes identifying an organization such as Burberry®, with which the community is affiliated, while the pages specifically exclude any logos, slogans or graphical images identifying Chatter® or salesforce.com. In this example, the Burberry® logos, themes and color schemes can be retrieved from the Burberry® website. Other communities can similarly include branding of other organizations, even though all of the communities are maintained on a social networking system provided by salesforce.com, inc. or another social network provider.

Some but not all of the techniques described or referenced herein are implemented using a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include updates presented as items or entries in the feed. Such a feed item can include a single update or a collection of individual updates. A feed item can include various types of data including character-based data, audio data, image data and/or video data. A social network feed can be displayed in a GUI on a display device such as the display of a computing device as described below. The updates can include various social network data from various sources and can be stored in an on-demand database service environment. In some implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Updates can include various types of updates, which may or may not be linked with a particular record. For example, updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of update that can be received and included in the user's news feed. Any number of users can follow a particular entity and thus view updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes updates and other feed items that are about the group as a whole, the group's purpose, the group's description, and group records and other objects stored in association with the group. Threads of updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a system diagram of an example of a social networking environment 100 with communities, in accordance with some implementations. In FIG. 1, a social networking system 104 includes any number of computing devices such as servers 108*a* and 108*b*. The servers 108*a* and 108*b* are in communication with one or more storage mediums configured to store and maintain relevant data used to perform some of the techniques disclosed herein. In this example, the storage mediums include a user ID database 112 and a privileges database 116. The user ID database 112 can maintain lists of IDs of users who are members of respective communities. By way of example, a "Community 1 User IDs" table 120 in database 112 includes a list of IDs of users who are members of Community 1, a "Community 2 User IDs" table 124 lists IDs of users who are members of Community 2, and so forth.

In FIG. 1, the privileges database 116 is configured to store privilege information identifying or specifying access rights and restrictions of users according to various attributes such as a specified user ID, type of user, role of user, type of community to which the user belongs, and/or a particular organization on behalf of which a community is maintained. Such privilege information can be customized and edited.

In FIG. 1, the social networking system servers 108 are configured to maintain one or more communities of users such as communities 128, 132 and 136 by interacting with databases 112 and 116 to identify members of those communities and privileges of members of a given community. Any number of users such as users 140*a*, 140*b* and 140*c* can be serviced by social networking system 104. That is, any such users 140 can have user IDs and other relevant data such as user profiles maintained in social networking system 104. By leveraging the information stored in storage mediums such as user ID database 112 and privileges database 116, communities 128, 132 and 136 of such users 140 can be defined. Thus, in this example, the community 128 includes users 140*a*, community 132 includes users 140*b*, and community 136 includes users 140*c* and one of users 140*b*. Thus, one of the users 140*b* is a member of both communities 132 and 136. When any such users 140 log in directly to a community, bypassing login pages of social networking system 104, or log in via social networking system 104 using a suitable computing device such as a laptop, tablet or smartphone, such users can be allowed to access data and take one or more actions available through social networking system 104 as permitted by the relevant privilege information stored in privileges database 116.

In FIG. 1, each of the communities 128, 132 and 136 is operated on behalf of a different organization. In this example, community 128 is operated on behalf of Org A, which in this example is Northanger Accounting. For example, the users 140*a* in community 128 may be employees, customers and/or partners of Northanger Accounting. By the same token, the community 132 is operated on behalf of Org B, which can be any type of organization. The community 136 is maintained on behalf of Org C. The various users in a given community can have different relationships with the organization on behalf of which the community is maintained. Thus, one or more of the users 140*b* can be an employee, customer or business partner of Org B. In this example, as mentioned above, one of the users 140*b* is a member of both communities 132 and 136. Thus, this user 140*b* could be an employee of Org B and a customer of Org C by way of example.

In FIG. 1, each community 128, 132 and 136 often has one or more pages of relevant community data maintained by social networking system 104, where such pages are accessible by a web browser program operating on a user's computing device. Thus, any user having access to a given community as defined by data stored in privileges database 116 can load part or all of such pages for display on the user's computing device. In the example of FIG. 1, a community's page or pages may be accessible at a web domain such as a URL including an org value identifying the specific organization on behalf of which the community is maintained. This org value may be a character such as a letter, number, symbol, or string of characters identifying the specific organization with which the community is affiliated. Thus, pages or other social network data available to users 140*a* in community 128 may be accessed at a URL such as northanger.force.com/community-northanger1/. In this example of a URL, the string "northanger" of "northanger.force.com" may provide the org value, which identifies Northanger Accounting. by name. In some instances, the "northanger" of "community-northanger1" may provide the org value identifying Northanger Accounting. Northanger Accounting may have other web pages available to the general public, for example, at the URL northanger.com, which is a different root domain than the northanger.force.com address at which community-specific pages are provided.

The page or pages maintained by the social networking system 104 for community 132 may be accessed at the URL orgb.force.com/community-orgb1/. As in the example of Northanger Accounting, the "orgb" of "orgb.force.com" or the "orgb" of "community-orgb1" may be the org value identifying Org B. One or more pages maintained on behalf of community 136 may similarly be accessed and identified with org values at the URL org.force.com/communityorgc1/.

As described in the examples below, when a user 140d directly logs in to a community using an appropriate login page at the community URL, and the user is identified as a member of a particular community, the web browser program on the user's computing device may be automatically routed to access a page at the URL specific to that user's community, such as northanger.force.com/community-northanger1/. The user may choose to navigate through additional pages accessible via the community or communities to which the user belongs.

In addition, the network address at which a community's pages are accessible may include branding information identifying by a particular brand the community and/or the organization on behalf of which the community is maintained. Thus, in FIG. 1, in the example of community 128, the URL northanger.force.com/community-northanger1/ includes the name "northanger" twice, that is, at the root domain and as part of the sub-domain identifying community 128. Such branding information may identify products and/or services provided by organization in some instances. Thus, a URL at which pages of community 128 are maintained may be customized to include names of brands recognizable to users having dealings with that organization, regardless of whether the users are employees, customers, partners or have other relationships with a particular organization.

Figure 2:
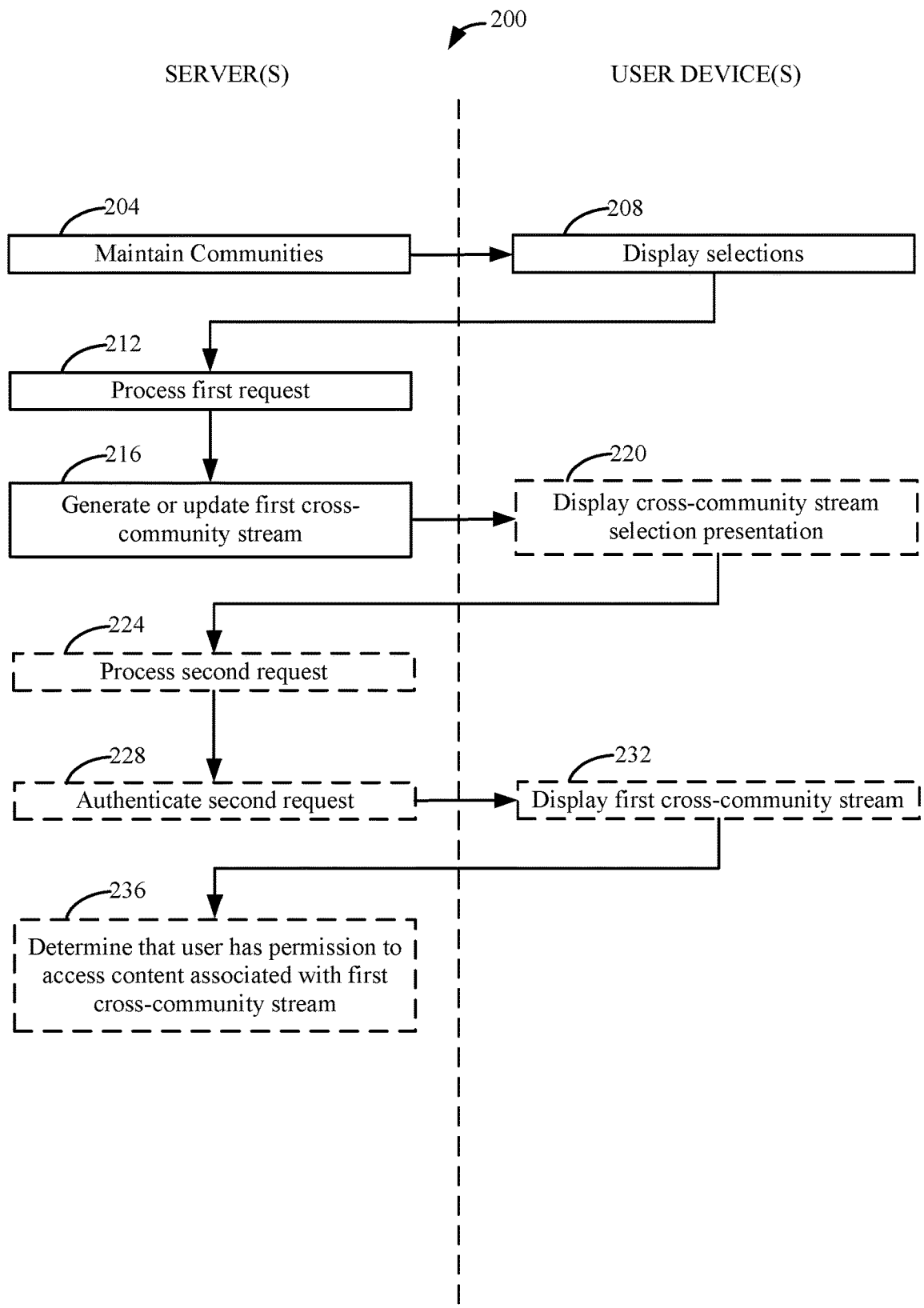
FIG. 2 shows a flowchart of an example of a method 200 for generating or updating cross-community streams, in accordance with some implementations.
Figure 3:
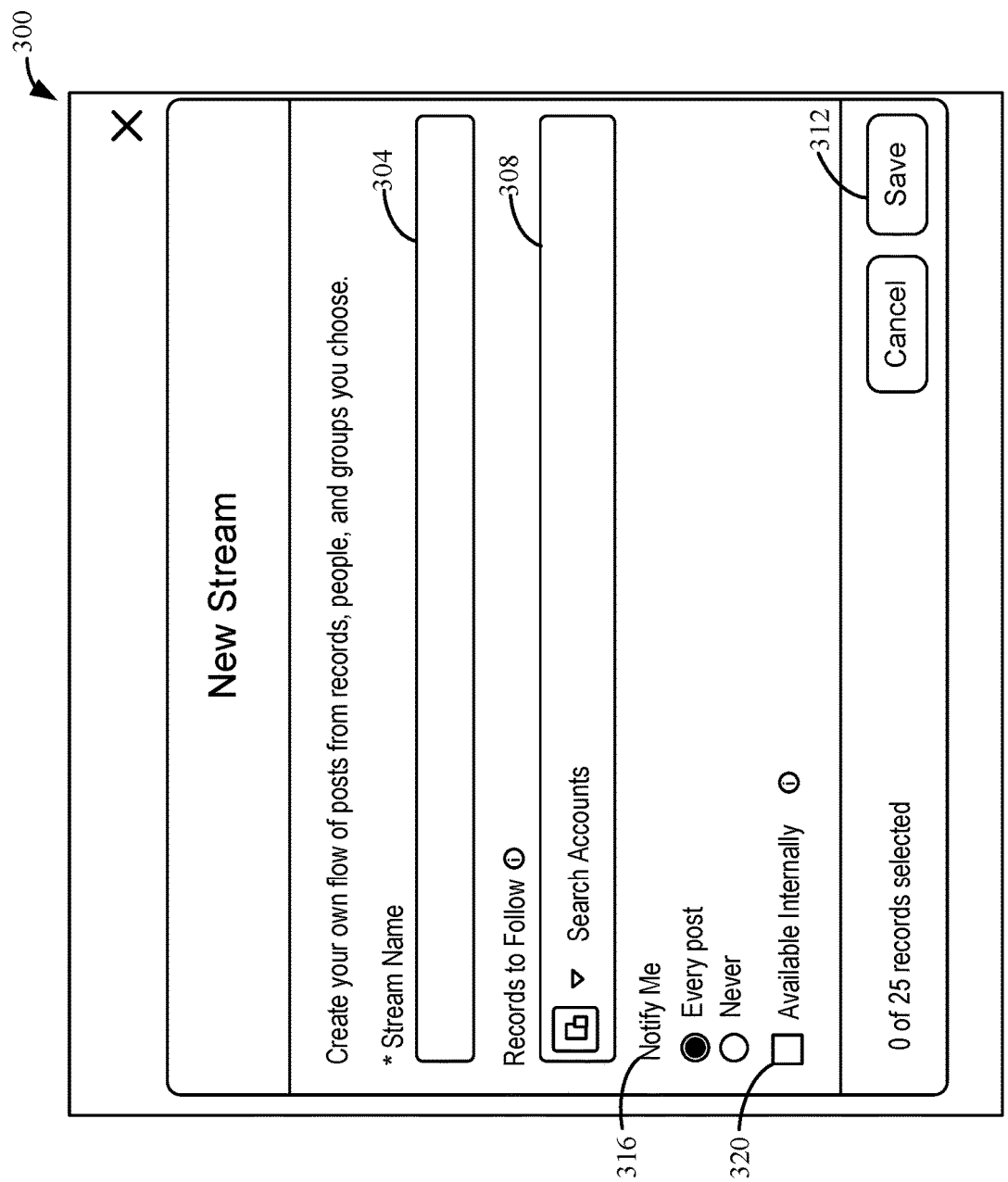
FIG. 3 shows an example of a presentation for generating or updating a cross-community stream as displayed on a computing device, in accordance with some implementations.
Figure 4A:
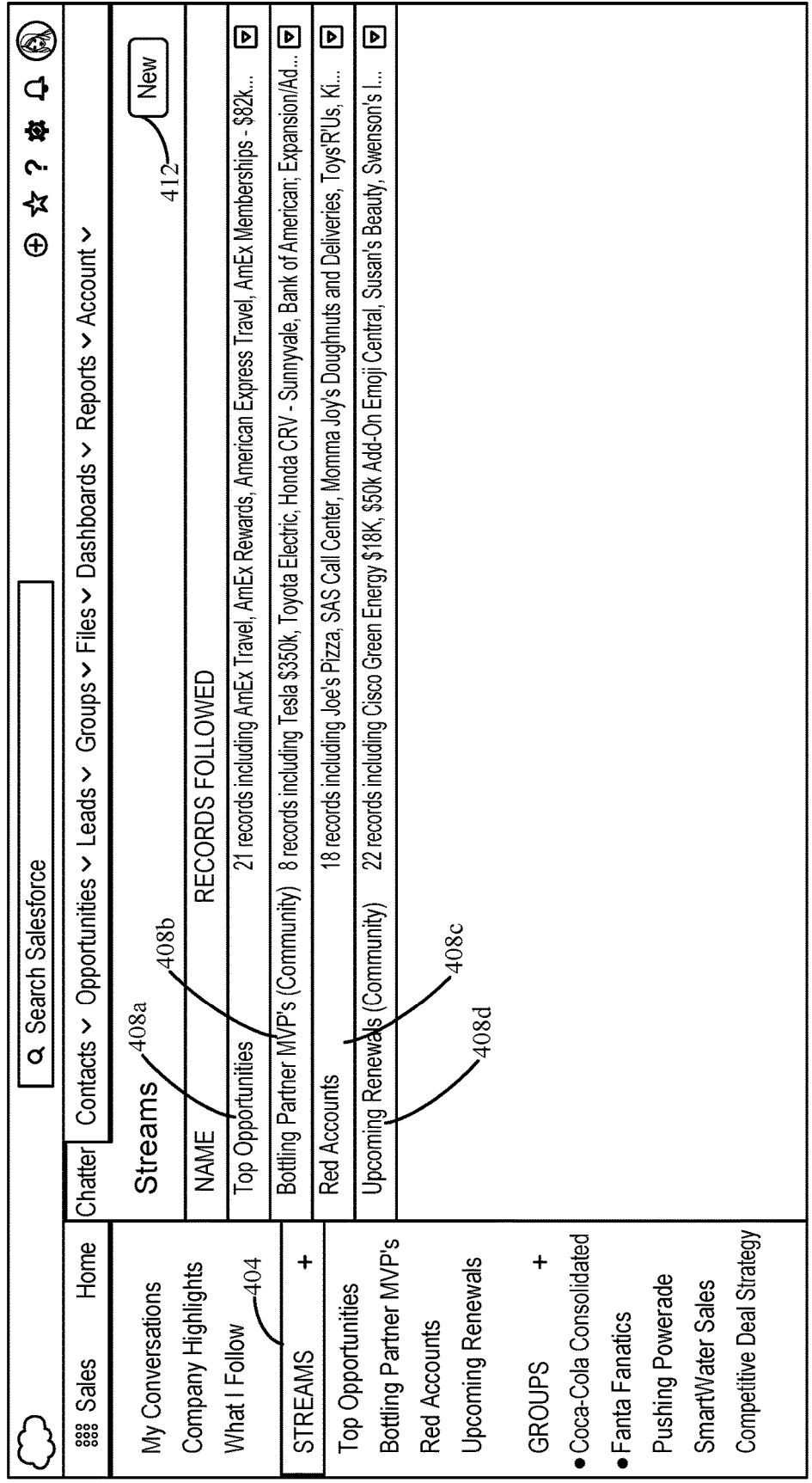
FIG. 4A shows an example of a cross-community stream selection presentation as displayed on a computing device, in accordance with some implementations.
Figure 4B:
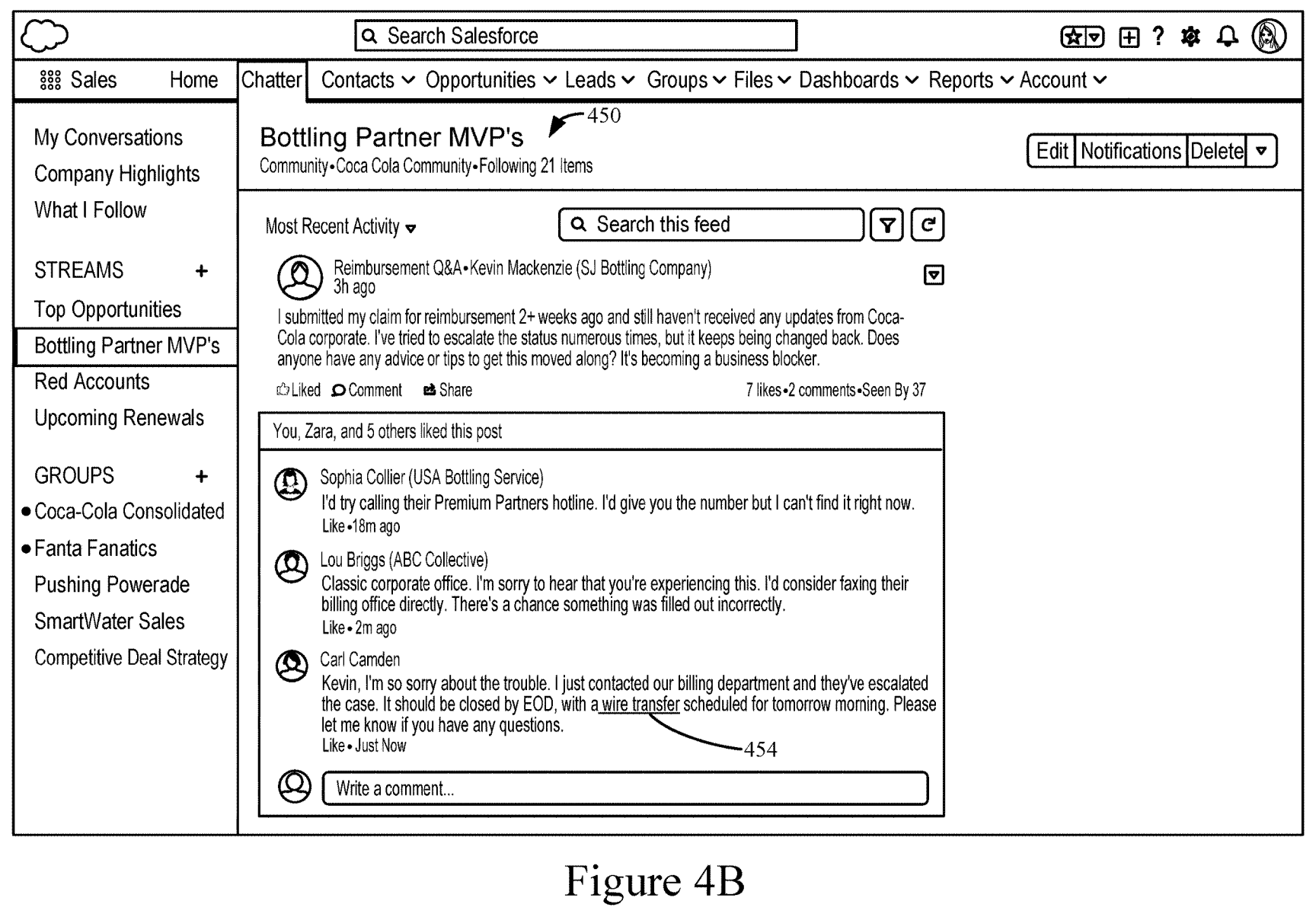

FIG. 2 shows a flowchart of an example of a method 200 for generating or updating cross-community streams, in accordance with some implementations. Method 200 may be performed using a server system and database system such as database system 16 of FIGS. 5A and 5B, described further below. FIG. 2 is described with reference to FIGS. 3-4B. FIG. 3 shows an example of a presentation for generating or updating a cross-community stream as displayed on a computing device, in accordance with some implementations. FIG. 4A shows an example of a cross-community stream selection presentation as displayed on a computing device, in accordance with some implementations. FIG. 4B shows an example of a cross-community stream as displayed on a computing device, in accordance with some implementations.

At 204 of FIG. 2, communities are maintained. By way of example, as discussed above in the context of FIG. 1, communities may be maintained on behalf of a variety of organizations such as Northanger Accounting. Such communities may be implemented using a social networking system such as Chatter® in an environment such as social networking environment 100 of FIG. 1. Accordingly, Chatter® users affiliated with an organization, e.g., employees, customers, and/or partners of the organization, may access the organization's communities via Chatter®.

In some implementations, members of a given community may have access to a certain set of records stored in the database system. By way of illustration, the members of the appeals community may have access to records, which are pertinent to the appeals community. On the other hand, members of the state tax community may have access to other records which are pertinent to state tax subject matter.

While some records may be exclusively available to members of a particular community, other records may be widely available. By way of example, some records may be available to all Chatter® users, other records may be available to members of one or more communities, and/or some records may be available only to Chatter® users having certain permissions, as described in further detail below.

At 208 of FIG. 2, a presentation for generating or updating a cross-community stream, such as presentation 300 of FIG. 3, is displayed in a user interface on a display of a device of a user of the social networking system. Such presentations for generating or updating a cross-community stream may include a number of selections, which allow a user of the social networking system to "assign" records to cross-community streams, causing such cross-community streams include feed content relating to the record. By way of example, when Isabella assigns the California Tax Appeals Decisions record to the appeals cross-community stream, the appeals cross-community stream will include feed content showing updates to the California Tax Appeals Decisions record. Use of such selections to request assignment of records to a cross-community stream is discussed in greater detail below in the context of 212 of FIG. 2. As discussed above, such cross-community streams may be curated feed content viewable by members of a variety of communities. By way of example, the appeals cross-community stream may be viewable by members of the appeals community, the state tax community or both.

At 212 of FIG. 2, a request to assign records to a cross-community stream is processed. By way of example, Henry may wish to create an appeals cross-community stream by entering the name "appeals" in stream name field 304 of FIG. 3. He may then select records to be included in the appeals stream by clicking or tapping records selection 308. Henry may then submit his request by clicking or tapping save selection 312. The Appeals cross-community stream may be viewable by members of two or more of the Northanger Accounting communities.

The features and selections of a presentation for generating or updating a cross-community stream may vary across implementations. By way illustration, in the example depicted in FIG. 3, presentation 300 includes a notification selection 316, which allows a user to select when he or she will be notified of activity in a cross-community stream. By way of example, a user may select "every post" if she wishes to be receive a notification, e.g., an email, text message, push notification, etc., whenever there is a new post in the cross-community stream. Alternatively, a user may select "never" if she does not wish to receive notifications of activity in the cross-community stream.

Presentation 300 of FIG. 3 also includes available internally selection 320, which allows users to make the cross-community stream available only to users internal to a particular community (or communities). In some implementations, a presentation for generating or updating a cross-community stream may contain a more extensive selection than available internally selection 320 of FIG. 3. By way of illustration, a presentation for generating or updating a cross-community stream may include a selection, which allows users to select particular communities in which a cross-community stream is available. By way of example, Isabella may make the appeals cross-community stream available to members of the appeals community and the state tax community, whereas Henry may make the help cross-community stream available to all Chatter® users affiliated with Northanger Accounting.

While presentation 300 is configured to allow a user to request generation of a new cross-community stream, a presentation for generating or updating a cross-community stream may also to allow a user to request to edit an existing cross-community stream. By way of example, Isabella may wish to remove several records from the appeals cross-community stream and assign a new record to the appeals cross-community stream. A cross-community stream editing presentation may be displayed on Isabella's computing device. The cross-community stream editing presentation may include a selection to request removal of records from the appeals cross-community stream. The cross-community stream editing presentation may further include a selection to request assignment of additional records to the appeals cross-community stream.

At 216 of FIG. 2, a cross-community stream is generated or updated. By way of example, the appeals cross-community stream may be generated in response to Henry's request at 212 of FIG. 2 when Henry clicks or taps save selection 312 of FIG. 3. Once generated, the appeals cross-community stream may be identified by data objects in databases of social networking system 104 of FIG. 1. Alternatively, if a request to edit an existing cross-community stream is processed at 212 of FIG. 2, the existing cross-community stream may be updated at 216 of FIG. 2.

In some but not all implementations, at 220 of FIG. 2, a cross-community stream selection presentation is displayed. By way of example, cross-community stream selection presentation 400 of FIG. 4A may be displayed on a display of Isabella's computing device when she clicks or taps streams button 404. The cross-community stream selection presentation 400 may include a vertical scroll with visual indications 408a-d. Each visual indication 408a-d may be a link to a cross-community stream accessible to Isabella. As such, each visual indication 408a-d of a corresponding cross-community stream may be selectable by Isabella to cause display of the corresponding cross-community stream on the display of her computing device. The cross-community stream selection presentation 400 also includes new stream selection 412. When a user clicks or taps new stream selection 412 she may be presented with a presentation for generating or updating a cross-community stream such as presentation 300 of FIG. 3.

In some but not all implementations, at 224 of FIG. 2, a request from a user to access a cross-community stream is processed. By way of illustration, Isabella may click or tap visual indication 408b of FIG. 4A to request access to the Bottling Partner MVP's (Community) stream 450 of FIG. 4B.

In some but not all implementations, at 228 of FIG. 2, the request of 224 is authenticated. Such authentication may occur in a variety of manners and may have a variety of layers. By way of illustration, in some implementations, a cross-community stream may be available to all Chatter® users affiliated with a given organization, in which case such a user may simply log into chatter, and click or tap a particular visual indication 408a-d of FIG. 4a in order to access the particular cross-community stream.

Also or alternatively, a cross-community stream may be available to social networking users affiliated with one or more of several communities. By way of example, the Franchise Tax Board cross-community stream may be accessible to members of either or both of the state tax community or the appeals community. As discussed above, in some implementations, a user may log in directly to a community, bypassing login pages of social networking system, or log in to the community via social networking system. As such, authentication of a request to access the Franchise Tax Board cross-community stream may occur by processing login information, from a user of the social networking system who is logging in to access the state tax community even if the user is not affiliated with the appeals community. Similarly authentication of a request to access the Franchise Tax Board cross-community stream may also occur by processing login information, from a user of the social networking system who is logging in to access the appeals community even if the user is not affiliated with the state tax community.

In some implementations, a particular cross-community stream may be only available to social networking users affiliated with all of a particular set of communities. In this case a request from a user to access the particular cross-community stream may be authenticated by determining that the user identity (ID) of the user is in a set of user IDs of users belonging to the each community in the particular set of communities, e.g., using the user ID database 112 of FIG. 1. By way of illustration, the state Supreme Court tax decisions cross-community stream is only accessible to users who are members of both the state tax community and the appeals community. As such, in order to authenticate Isabella's request to access the state Supreme Court Tax decisions cross-community stream, it will be determined that Isabella's user ID is in the set of user IDs of users belonging to the state tax community and the set of user IDs of users belonging to the appeals community.

In some but not all implementations, at 232 of FIG. 2, a cross-community stream is displayed. By way of example, Bottling Partner MVP's (Community) stream 450 of FIG. 4B may be displayed on Isabella's computing device after Isabella's request to access the Bottling Partner MVP's (Community) stream 450 is authenticated at 228 of FIG. 2, as described above.

Alternatively, if the Bottling Partner MVP's (Community) stream 450 is available to all Chatter® users, the Bottling Partner MVP's (Community) stream 450 may be displayed on Isabella's computing device without authentication after Isabella clicks or taps visual indication 408b of FIG. 4A.

In some but not all implementations, at 232 of FIG. 2, it is determined that a user has permission to access content of a cross-community stream. By way of example, attachments or other restricted resources or information may be displayed in a cross-community stream. As such, some users may not have permission to access certain content of a cross-community stream. Such restricted content may be protected using a "permissions" framework. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of an on-demand database service environment. Thus, users may receive permission to access certain resources. A permission server in an on-demand database service environment may store criteria data regarding the types of users and permission sets to assign to each other. For example, a computing device may provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users may gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein may provide scalable, reliable, and efficient mechanisms for a developer to create tools that manage a user's permissions across various sets of access controls and across types of users. Administrators who use this tooling may effectively reduce their time managing a user's rights, integrate with external systems, and report on rights for auditing and troubleshooting purposes.

Referring again to FIG. 4B, Isabella may click link 454 in order to view a particular wire transfer. Upon Isabella's selection of link 454 a database system may access the permissions and permission sets assigned to Isabella to determine that she has permission to access the particular wire transfer.

Alternatively, Catherine may not have permission to access the particular wire transfer. In this case, the database system may access the permissions and permission sets assigned to Catherine to determine that she does not have permission to access the particular wire transfer. Therefore, Catherine may be prohibited from accessing the particular wire transfer.

In some implementations, when a user is prohibited from accessing content, he or she may be presented with an error message. By way of illustration, Isabella may be presented with an error message stating "ERROR: you do not have permission to access this wire transfer."

In some implementations, cross-community streams may be shared. By way of illustration, John, the human resources (HR) director at Northanger Accounting may create an HR stream with information related to overtime pay, sick leave, vacation time, and other HR concerns. John may then share the HR stream with all new Northanger employees. As such, Northanger employees may use the disclosed techniques to consume HR-related information from the context of any of Northanger Accounting's many communities.

Also or alternatively, cross-community streams may be automatically generated based on individual users' past behavior or the past behavior of users of communities. By way of example, a predictive algorithm such as a random forest model, standard frequentist or Bayesian inference, and/or artificial intelligence (AI) such as Salesforce Einstein may be applied to identify relevant feed content based on individual users' past behavior or the past behavior of users of communities. Such relevant content may then be included in automatically generated streams.

In some implementations, in addition to consuming information from cross-community streams, users may be able to interact with cross-community streams. By way of example, users may be able to bookmark, comment on, edit, and/or share content from cross-community streams.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
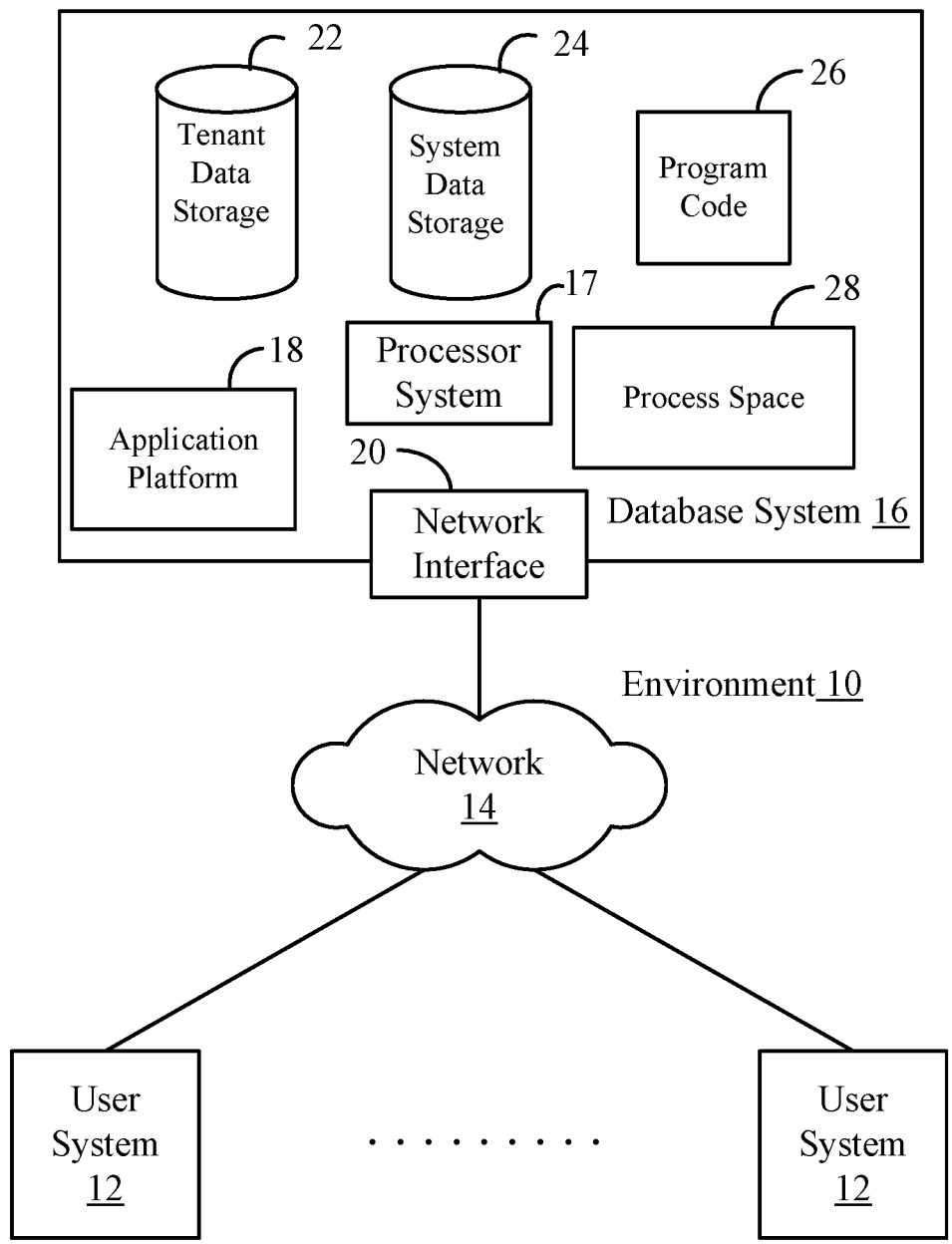
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web browser-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
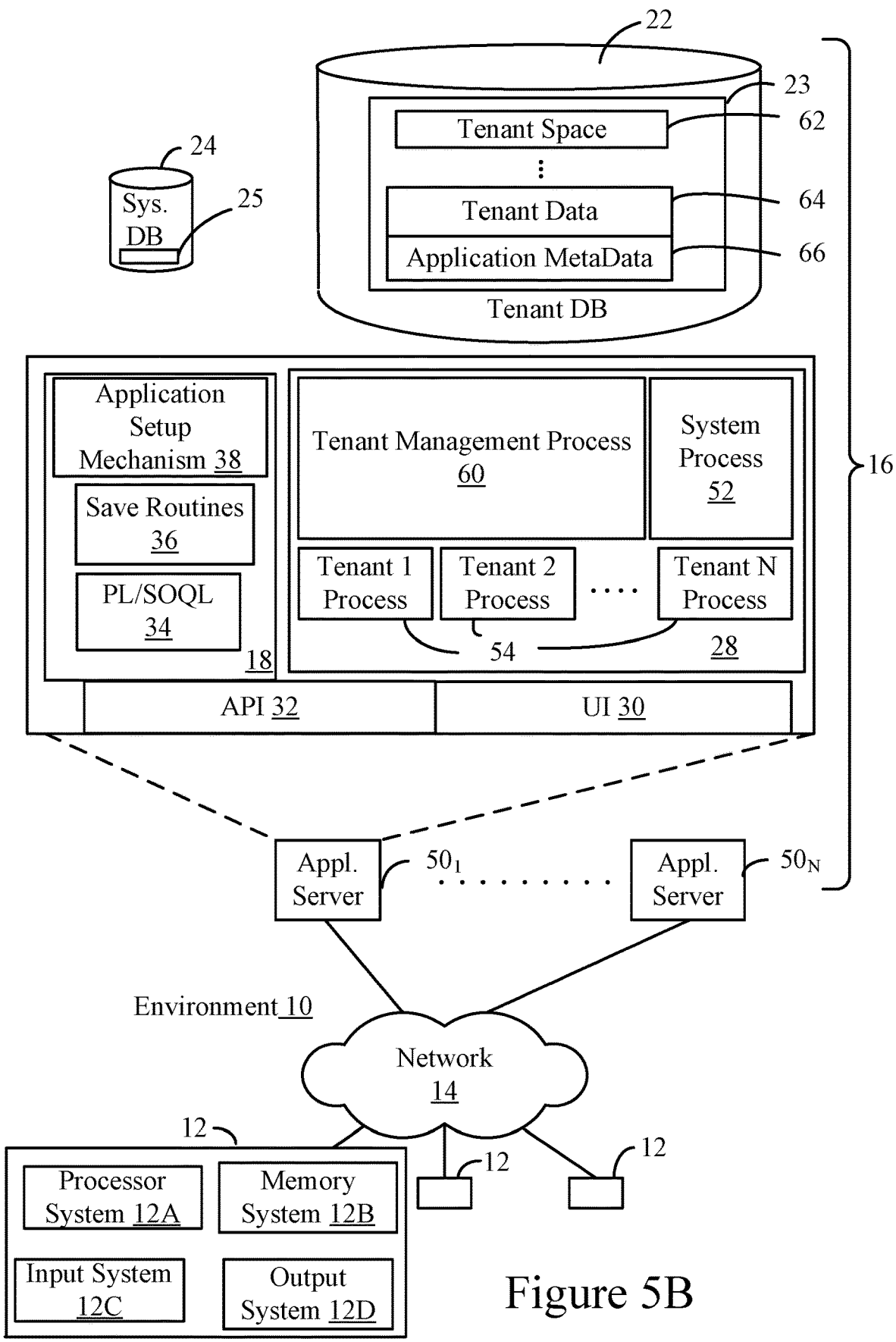
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server 50₁ might be coupled via the network 14 (e.g., the Internet), another application server 50_{N-1} might be coupled via a direct network link, and another application server 50_N might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
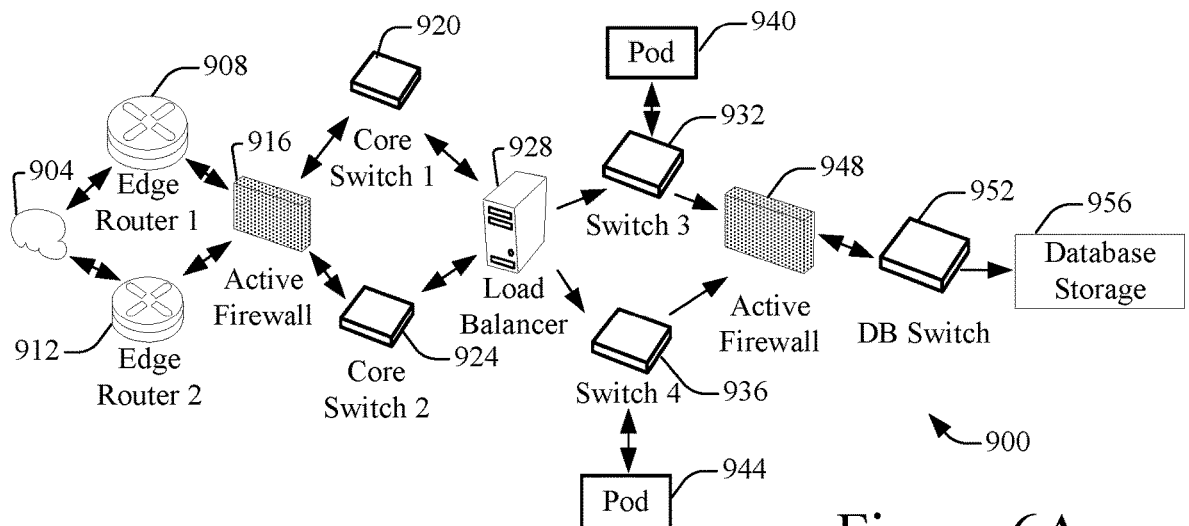
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
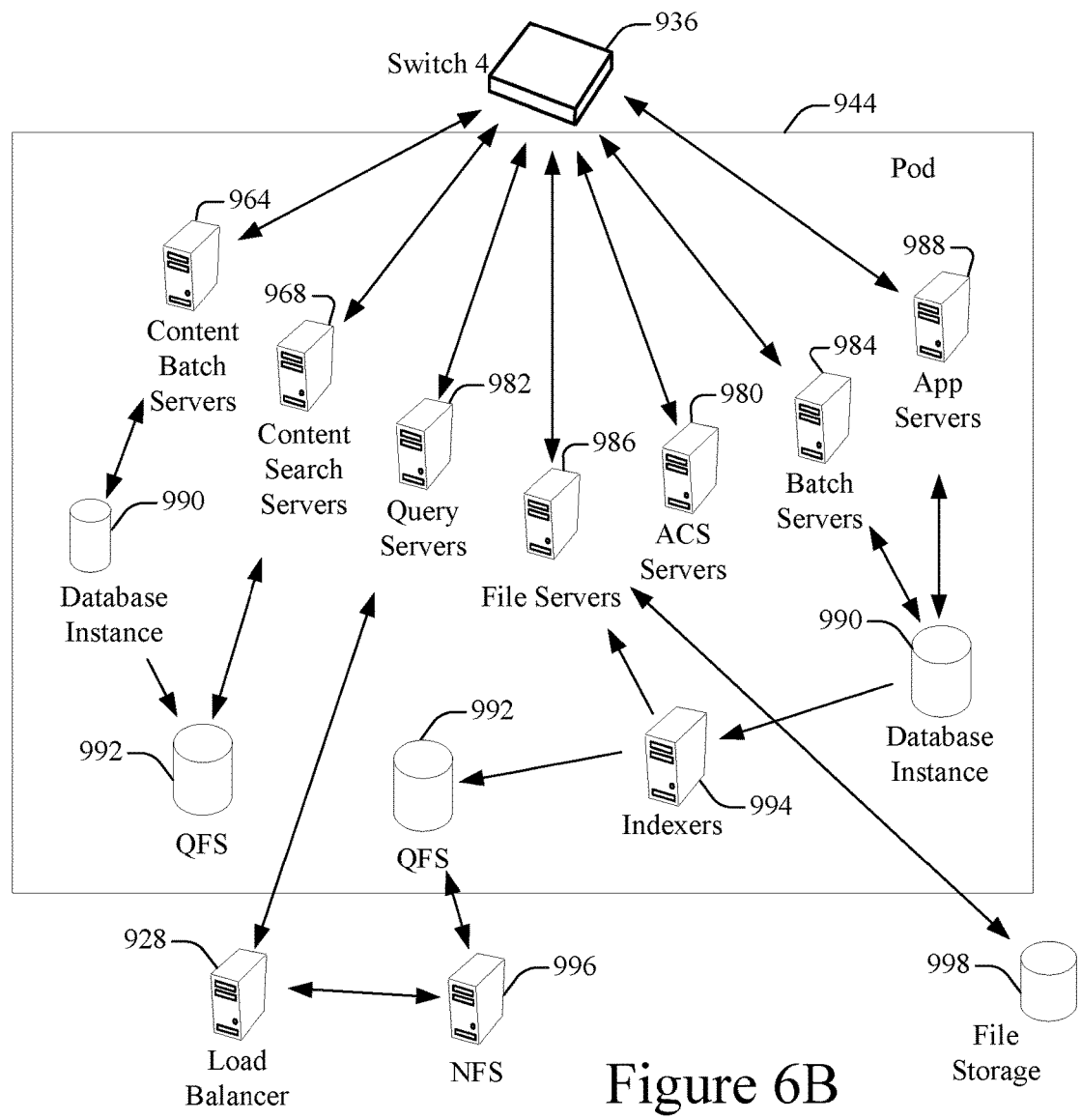
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
accessing a plurality of communities of users of a social networking system associated with the database system, each community maintained in the social networking system to have a respective subset of the users as members and to have a respective social network feed dedicated to the community;
displaying, in a user interface on a display of a device of a first user of the social networking system, one or more selections operable to assign communities and records stored in one or more databases to one or more cross-community streams, each record having a respective social network feed dedicated to the record in the social networking system;
obtaining a first request from the first user device to assign a first subset of the communities and assign a first subset of the records to a first cross-community stream, the first request indicating user selection of the first subset of communities and the first subset of records by the first user;
assigning the first subset of communities and the first subset of records to the first cross-community stream;
generating or updating, responsive to assigning the first subset of communities and the first subset of records, the first cross-community stream to include feed content of:
respective social network feeds dedicated to communities in the first subset of communities, and
respective social network feeds dedicated to records in the first subset of records; and
displaying, in the user interface, a presentation of a first community of the plurality of communities, the presentation comprising a graphical element selectable to cause display of the generated or updated first cross-community stream without navigating away from the presentation of the first community in the user interface.

2. The system of claim 1, the database system further configurable to cause:
obtaining a second request, from a device of a second user of the social networking system, to access the first cross-community stream;
determining, using the database system, that a user identity (ID) associated with the second user is both:
one of a plurality of first user identities (IDs) of a first plurality of users belonging to a first community, and
one of a plurality of second user identities (IDs) of a second plurality of users belonging to a second community; and
displaying, on a display of the second user device, the first cross-community stream.

3. The system of claim 2, the database system further configurable to cause:
determining, based on a first one of a plurality of permission sets stored in a database of the database system, that the second user has permission to access content associated with the first cross-community stream.

4. The system of claim 1, the database system further configurable to cause:
displaying, on a display of a device of a second user of the social networking system, a cross-community stream selection presentation, the cross-community stream selection presentation comprising:
a vertical scroll comprising visual indications corresponding to cross-community streams, each visual indication being selectable to cause display of the corresponding cross-community stream on the display, and
a further selection operable to cause creation of a further cross-community stream.

5. The system of claim 1, the database system further configurable to cause:
processing first login information, from a second user of the social networking system, the first login information being associated with a first community, the first login information being separate from second login information associated with a second community; and
displaying, on a device of the second user, the first cross-community stream.

6. The system of claim 1, wherein the first subset of records are customer relationship management (CRM) records comprising one or more of: an account, a task, a lead, a contact, a contract, an opportunity, a user record, or a group record.

7. The system of claim 1, wherein the first cross-community stream comprises content that is automatically determined to be relevant to members of a first community and/or members of a second community based on past behavior of the members of the first community and/or the members of the second community.

8. A method comprising:
accessing, using a database system, a plurality of communities of users of a social networking system associated with the database system, each community maintained in the social networking system to have a respective subset of the users as members and to have a respective social network feed dedicated to the community;
causing display, in a user interface on a display of a device of a first user of the social networking system, of one or more selections operable to assign communities and records stored in one or more databases to one or more cross-community streams, each record having a respective social network feed dedicated to the record in the social networking system;
obtaining a first request from the first user device to assign a first subset of the communities and assign a first subset of the records to a first cross-community stream, the first request indicating user selection of the first subset of communities and the first subset of records by the first user;
assigning the first subset of communities and the first subset of records to the first cross-community stream;
generating or updating, responsive to assigning the first subset of communities and the first subset of records, the first cross-community stream to include feed content of:
respective social network feeds dedicated to communities in the first subset of communities, and respective social network feeds dedicated to records in the first subset of records; and causing display, in the user interface, of a presentation of a first community of the plurality of communities, the presentation comprising a graphical element selectable to cause display of the generated or updated first cross-community stream without navigating away from the presentation of the first community in the user interface.

9. The method of claim 8, the method further comprising:

obtaining a second request, from a device of a second user of the social networking system, to access the first cross-community stream;

determining, using the database system, that a user identity (ID) associated with the second user is both:
one of a plurality of first user identities (IDs) of a first plurality of users belonging to a first community, and
one of a plurality of second user identities (IDs) of a second plurality of users belonging to a second community; and causing display, on a display of the second user device, of the first cross-community stream.

10. The method of claim 9, the method further comprising:

determining, based on a first one of a plurality of permission sets stored in a database of the database system, that the second user has permission to access content associated with the first cross-community stream.

11. The method of claim 8, the method further comprising:

causing display of, on a display of a device of a second user of the social networking system, a cross-community stream selection presentation, the cross-community stream selection presentation comprising:
a vertical scroll comprising visual indications corresponding to cross-community streams, each visual indication being selectable to cause display of the corresponding cross-community stream on the display, and
a further selection operable to cause creation of a further cross-community stream.

12. The method of claim 8, the method further comprising:

processing first login information, from a second user of the social networking system, the first login information being associated with a first community, the first login information being separate from second login information associated with a second community; and causing display, on a device of the second user, of the first cross-community stream.

13. The method of claim 8, wherein the first subset of records are customer relationship management (CRM) records comprising one or more of: an account, a task, a lead, a contact, a contract, an opportunity, a user record, or a group record.

14. The method of claim 8, wherein the first cross-community stream comprises content that is automatically determined to be relevant to members of a first community and/or members of a second community based on past behavior of the members of the first community and/or the members of the second community.

15. A computer program product comprising a non-transitory computer-readable medium storing computer-readable program code capable of being executed by one or more processors, the program code comprising instructions configurable to cause:

accessing, using a database system, a plurality of communities of users of a social networking system associated with the database system, each community maintained in the social networking system to have a respective subset of the users as members and to have a respective social network feed dedicated to the community;

displaying, in a user interface on a display of a device of a first user of the social networking system, one or more selections operable to assign communities and records stored in one or more databases to one or more cross-community streams, each record having a respective social network feed dedicated to the record in the social networking system;

obtaining a first request from the first user device to assign a first subset of the communities and assign a first subset of the records to a first cross-community stream, the first request indicating user selection of the first subset of communities and the first subset of records by the first user;

assigning the first subset of communities and the first subset of records to the first cross-community stream;

generating or updating, responsive to assigning the first subset of communities and the first subset of records, the first cross-community stream to include feed content of:
respective social network feeds dedicated to communities in the first subset of communities, and
respective social network feeds dedicated to records in the first subset of records; and displaying, in the user interface, a presentation of a first community of the plurality of communities, the presentation comprising a graphical element selectable to cause display of the generated or updated first cross-community stream without navigating away from the presentation of the first community in the user interface.

16. The computer program product of claim 15, the instructions further configurable to cause:

obtaining a second request, from a device of a second user of the social networking system, to access the first cross-community stream;

determining, using the database system, that a user identity (ID) associated with the second user is both:
one of a plurality of first user identities (IDs) of a first plurality of users belonging to a first community, and
one of a plurality of second user identities (IDs) of a second plurality of users belonging to a second community; and displaying, on a display of the second user device, the first cross-community stream.

17. The computer program product of claim 16, the instructions further configurable to cause:

determining, based on a first one of a plurality of permission sets stored in a database of the database system, that the second user has permission to access content associated with the first cross-community stream.

18. The computer program product of claim 15, the instructions further configurable to cause:

displaying, on a display of a device of a second user of the social networking system, a cross-community stream selection presentation, the cross-community stream selection presentation comprising:
a vertical scroll comprising visual indications corresponding to cross-community streams, each visual indication being selectable to cause display of the corresponding cross-community stream on the display, and a further selection operable to cause creation of a further cross-community stream.

19. The computer program product of claim 15, the instructions further configurable to cause: processing first login information, from a second user of the social networking system, the first login information being associated with a first community, the first login information being separate from second login information associated with a second community; and displaying, on a device of the second user, the first cross-community stream.

20. The computer program product of claim 15, wherein the first subset of records are customer relationship management (CRM) records comprising one or more of: an account, a task, a lead, a contact, a contract, an opportunity, a user record, or a group record.

\* \* \* \* \*